(12) United States Patent
Van Zile et al.

(10) Patent No.: US 6,551,465 B1
(45) Date of Patent: Apr. 22, 2003

(54) DIVIDING WALL COLUMN CONTROL SYSTEM

(75) Inventors: Charles P. Van Zile, Des Plaines, IL (US); James W. Harris, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/840,224

(22) Filed: Apr. 23, 2001

(51) Int. Cl.⁷ .............................. B01D 3/14; B01D 3/42
(52) U.S. Cl. .................... 202/158; 159/44; 202/160; 202/181; 202/206; 203/1; 203/2; 203/98; 203/99; 203/DIG. 9; 203/DIG. 18; 203/DIG. 19; 196/111; 196/132
(58) Field of Search .................. 203/1, 2, DIG. 18, 203/DIG. 9, 98, 99, 87, DIG. 19; 202/181, 189, 160, 158, 206; 196/141, 111, 132; 137/455, 468; 159/44

(56) References Cited

U.S. PATENT DOCUMENTS

| 2,471,134 A | | 5/1949 | Wright .................... 196/100 |
| 3,855,074 A | | 12/1974 | Mosler et al. ............... 203/2 |
| 4,230,533 A | | 10/1980 | Giroux ...................... 203/1 |
| 5,902,460 A | * | 5/1999 | Gerhold .................. 196/111 |
| 6,077,985 A | * | 6/2000 | Stork ..................... 202/158 |

OTHER PUBLICATIONS

Mutalib, M.I. Abdul et al. *Operation and Control of Dividing Wall Distillation Columns (Part 1)* Trans IchemE, vol. 76, Part A, Mar. 1998, pp. 308–318.
Mutalib, M.I. Abdul et al. *Operation and Control of Dividing Wall Distillation Columns (Part 2)* Trans IChemE, vol. 76, Part A, Mar. 1998, pp. 319–334.
Halvorsen, I.J. et al. *Optimizing Control of Petlyuk Distillation: Understanding the Steady–State Behavior* Computers chem Engng, vol. 21, Suppl., 1997, pp. S249–S254.
Lestak, F. et al. *The Control of Dividing Wall Column* (Centre for Process Integration, UMIST, Manchester, UK) Chemical Engineering Research & Design, Institution of Chemical Engineers 1993, 71 (A3) ISSN 0263–8762 p. 307.
Rudd, H. *Thermal Coupling for Energy Efficiency* Supplement to The Chemical Engineer Aug. 27, 1992, s14.

* cited by examiner

Primary Examiner—Virginia Manoharan
(74) Attorney, Agent, or Firm—John G. Tolomei; James C. Paschall; David J. Plasecki

(57) ABSTRACT

The operation of the dividing wall section of a dividing wall column is controlled by a control apparatus comprising a ratio controller which divides the liquid flowing into the dividing wall section. The rate of return of overhead liquid to the column is set by monitoring the temperature in the top of the product dividing wall section and the sidecut product draw rate is set by monitoring a temperature in the bottom of the product dividing wall section.

8 Claims, 1 Drawing Sheet

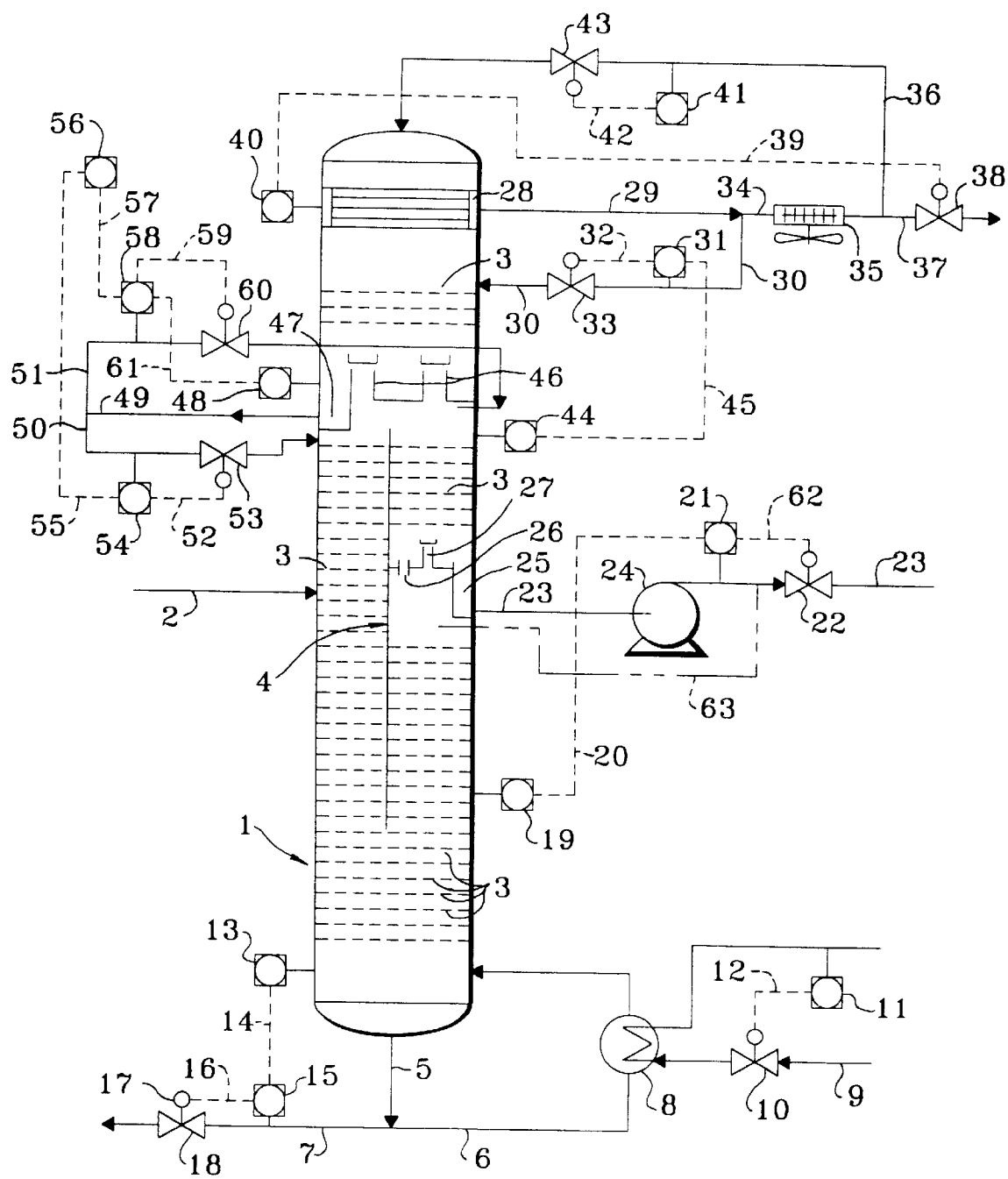

DIVIDING WALL COLUMN CONTROL SYSTEM

FIELD OF THE INVENTION

The invention relates to a control system for use in fractional distillation columns. More specifically the invention relates to a control system for use in a dividing wall fractionation column.

BACKGROUND OF THE INVENTION

Fractional distillation is a well developed unit operation used in the petrochemical, chemical and petroleum refining industries to separate volatile chemical compounds. The operation of fractionation columns is regulated by control systems monitoring such variables as temperature, liquid levels and fluid flow rates. The control systems need to change operation of the column as by increasing the rate of heat input or decreasing the rate at which a stream is removed to compensate for occasional or periodic changes in the composition of the feed stream to the fractionation column or other factors which can affect the operation of the column.

RELATED ART

Fractionation columns are widely employed to do myriad separations in a number of industries. Control systems for fractionation columns have therefore reached a high state of development including the use of on-line analytical instruments and computerized optimization. They still, however, rely to a great extent on the measurement of temperatures and liquid levels in the fractionation column by equipment such as shown in U.S. Pat. No. 3,855,074 issued to H. A. Mosler et. al.

The dividing wall or Petlyuk configuration for fractionation columns was initially introduced some 50 years ago by Petlyuk et al. Dividing wall columns have been employed for the separation of hydrocarbon mixtures as evidenced by the disclosure of U.S. Pat. No. 2,471,134 issued to R. O. Wright. Recently the use of dividing wall columns has begun to expand because of the greater recognition that in certain situations dividing wall columns can provide benefits above those of conventional fractionation columns. For instance, a commercialization of a fractionation column employing this technique is described in the article *Thermal Coupling for Energy Efficiency* appearing at page s14 of a supplement to The Chemical Engineer, Aug. 27, 1992.

Control systems for dividing wall columns are not as mature or as commonly described as for conventional columns. Studies of control variables and responses in a small scale pilot plant column are given in *Operation and Control of Dividing Wall Distillation Columns*, by A. Mutalib and R. Smith, *Part 1: Degrees of Freedom and Dynamic Simulation*, Trans. IChemE. Vol. 76, Part A, March 1998, pages 308–318 and *Part 2: Simulation and Pilot Plant Studies Using Temperature Control*, Trans. IChemE, Vol 76, Part A, March 1998, pages 319–334. Two other papers directed to the general control of dividing wall columns are *The Control of Dividing Wall Column* (Centre for Process Integration, UMIST, Manchester, UK) by F. Lestak and R. Smith appearing at page 307 of Chemical Engineering Research & Design, Institution of Chemical Engineers (1993) 71 (A3) and *Optimizing Control of Petlyuk Distillation: Understanding the Steady-State Behavior* by Ivar J. Halvorsen and Sigurd Skogestad at pages s249–s254 of Computers Chem. Engng., Vol. 21, Suppl., 1997 (Elsevier Science Ltd.)

An example of an actual control system for a dividing wall column is provided in U.S. Pat. No. 4,230,533 issued to V. A. Giroux. This reference is also relevant as liquid is collected in an upper portion of the column and divided between the two sides of the dividing wall by level control.

BRIEF SUMMARY OF THE INVENTION

The invention is a method of controlling the operation of a dividing wall fractional distillation column. The liquid flowing downward in an upper portion of the column is collected and then divided by a ratio controller between parallel feed and product dividing wall sections. Temperature measurements taken in upper and lower portions of the column are used to control respectively the rate at which overhead liquid is returned to the column and the rate at which the sidedraw product is removed from the product dividing wall section.

One embodiment of the invention may be described as a dividing wall fractional distillation column comprising a vertical outer column having a vertical central portion divided into a feed section and a parallel product section by a dividing wall, the parallel feed and product sections having upper and lower ends, with the dividing wall column also comprising an upper section containing vapor-liquid contacting devices; an overhead condensing system in which vapor rising from the upper section of the column is at least partially condensed and an overhead liquid is produced; a first flow control valve which controls the flow of a portion of said overhead liquid into the upper section of the column as reflux; a first temperature sensor, which monitors the temperature in the upper end of the product section of the column and generates a signal used in controlling the operation of the first flow control valve; a first liquid collection system located in an upper portion of the column below the upper section and above the dividing wall, the first liquid collection system blocking downward liquid flow through substantially all of the cross section of the column; a flow ratio controller which controls the division of liquid collected in the first liquid collection system into separate streams which flow via a first and second conduits into the feed and product sections of the column; a second liquid collection system, which is located in an intermediate portion of product section of the column, with the second liquid collection system having a liquid collection well from which a side product is removed from the column; a second flow control valve which controls the rate of side product removal in response to a second signal; a second temperature sensor, which monitors the temperature in the lower end of the product section of the column and generates a signal used in controlling the operation of the second flow control valve; a control system regulating the heat input to the column by a reboiler system located at the bottom of the column; and, a flow control system regulating the rate at which a net bottoms product is removed from the column.

BRIEF DESCRIPTION OF THE DRAWING

The drawing is a simplified diagram of a dividing wall fractionation column employing a control system according to the subject invention.

DETAILED DESCRIPTION AND PREFERRED EMBODIMENTS

Fractional distillation is a well developed unit operation employed in a large number of chemical, petrochemical and petroleum refining processes to separate a wide variety of chemical compounds. This prominence has led to a great effort to optimize column operation by improving both the equipment and the procedures, reducing the cost of operating the process and to reducing the cost of the required equipment. A development made over 50 years ago with these objects in mind was the development of the dividing wall column. The advantages of this fractionation column arrangement are now becoming more widely accepted and dividing wall columns are being applied to a larger number of separations.

Before going further, it is useful to define what is referred to herein as a dividing wall column. By this term it is intended to identify a fractional distillation column, of general applicability, which has as one of its basic components a substantially fluid tight vertical wall extending through a significant portion of its height and located in a central portion of the column to divide this central portion into at least two vertical, parallel vapor-liquid contacting sections. The top and bottom of the wall terminate in the column at a point distant from the respective end of the column such that there is open communication across the column interior at the top and bottom of the dividing wall. That is, vapor leaving the top of each section and liquid leaving the bottom of each section flows into a common section and is admixed. Components of the feed leaving the one section can then enter the other dividing wall section or continue toward the relevant end of the column. Each section will contain fractionation trays and/or packing intended to promote the separation. The feed stream to the column enters on a first receiving side of the dividing wall section of the column, typically in a middle portion of this receiving section of the column. The feed may, however, enter near the top or bottom of the receiving section. A further distinguishing point of a dividing wall column is that the feed stream is divided into at least three different product streams. One of these is removed from the partial-column product section of the column opposite the receiving section. The other two product streams are removed near the top and bottom of the column in a manner similar to a conventional column. The separations performed in a dividing wall column are those normally performed in a conventional column and thus dividing wall columns operate at conventional fractional distillation conditions. The pressure can range from subatmospheric to about 500 psig and the bottom temperature can range from about 10 to about 350 degrees C. Cryogenic operations could also be performed.

The control of a dividing wall column is more complicated and less intuitive than the control of a conventional column. It is the objective of this invention to provide a control system for a dividing wall column. It is another objective to provide a control system to control the liquid flow rates through the two adjacent sections located in the middle portion (dividing wall section) of the column. It is a specific objective to provide a robust and stable control system for controlling the receiving and product sections of a dividing wall column.

These objectives are met by a control system which employs a liquid trap to collect descending liquid just above the dividing wall section of the column and a ratio control system to then divide the liquid between the feed and product dividing wall sections of the column. This ratio is set initially based upon consideration of the calculated desired liquid flow (reflux) rates through each section of the dividing wall section. When the column is in operation the ratio may be adjusted, but it is normally fixed. Product purity is controlled by the reflux rate to the top of the column. The rate at which liquid collected in the overhead condensing system is returned to the column is controlled on the basis of a temperature measurement taken within or near the top of the upper portion of the dividing wall section of the column, preferably within the product section. The rate of liquid return is increased as the temperature at this point moves above a setpoint. As this rate of liquid return to the column is increased, liquid is collected at a faster rate in the liquid collection system, which is located in the upper section of the column just above the dividing wall section, raising the level in the liquid collection well. This system is referred to herein as the first liquid collection system. The level control in the well of this section will sense this increase in liquid level and signal for the manifold system to begin removing more liquid for passage downward into the dividing wall section of the column. The flow through one line of the manifold system will increase leading the ratio controller to increase the flow rate in the other line. This liquid flow will thus increase proportionately in both sides of the dividing wall column.

The rate at which the sidecut product stream is removed from a midpoint of the product section of the dividing wall section is set in response to a temperature measurement taken within a lower portion of the product section. Decreasing the net rate of sidecut product removal increases the liquid remaining to flow downward through the product section as lower reflux. The temperature in the lower section of the product section will therefore decrease. The rate of product withdrawal is therefore increased if the measured temperature is below a setpoint. Control may be affected through directly regulating the amount of totally trapped liquid which is returned as lower reflux or by only withdrawing a controlled amount of liquid, with the remainder overflowing a weir to form the lower reflux. The temperature setpoints may be set manually or be the result of a higher level control system. Preferably heat is added to the reboiling system at the bottom of the column at a substantially constant rate subject to only occasional, possibly manual adjustment.

The figure is a simplified illustration of a dividing wall fractionation column 1 employing the subject control system. The figure also illustrates the use of required supplemental control components at the top and bottom portions of the column. Not shown on the drawing are various accouterments, subassemblies, non-essential control devices, pumps, vessel internals, etc., which may also be of a conventional nature. Also not shown is a pressure control system. Pressure control can be performed by conventional means. For instance, many feeds amenable to separation in a dividing wall column often do not contain light or non condensable gases except as low volume impurities which can be removed via a vacuum system in the case of operation under a vacuum. An example of this is the fractionation of a kerosene boiling range hydrocarbon fraction to produce a limited carbon number range product as the feed to a downstream liquid-liquid extraction unit. Proper feed storage and processing normally greatly reduces the need for removal of light gases and hence pressure control is not a significant problem. Referring now to the drawing, a feed stream comprising a kerosene boiling range fraction enters the fractionation column via line 2. The objective of the fractionation is to produce a middle fraction comprising substantially all of the $C_9$–$C_{15}$ hydrocarbons in the feed. Hydrocarbons with lower or higher carbon numbers are to be rejected in the overhead and bottoms respectively. The feed stream in this instance is fed near the midpoint of the dividing wall section of the column. Feed streams may enter a dividing wall column near either the top or bottom portion of the receiving section of the dividing wall section. The dividing wall section of the column 1 is that portion of the column which in this instance is to the left of the dividing wall 4 and which receives the feed stream 2. The opposite side of the dividing wall forms a section of the column referred to herein as the product section of the dividing wall section of the column. These two parallel fractionation sections form the central portion of the column. In this instance the entire fractionation column 1 contains fractionation trays 3 which extend horizontally across the cross section of the column. Larger full width or full diameter trays 3 are located in the upper and lower portions of the column which are located respectively above and below the divided wall section of the column. The feed and product sections of the dividing wall section of the column both also contain fractionation trays 3. The type and/or design of the fractionation trays may vary between the two sections of the dividing wall section of the column. The size and tray spacing of the trays in these two sections may also vary. Furthermore, any portion of the column may contain alternative vapor-liquid contacting devices, such as dumped or structured packing. The choice between trays and packing is related to the performance of the fractional distillation and does not form a part of the subject invention. Conventional trays, such as sieve trays arranged as multiple downcomer trays or cross-flow trays, can be employed. For example, the column designed for a commercial scale separation of the feed kerosene used in this description contained a total of 64 trays. Nineteen trays are located in the upper section of the column (above the dividing wall section) and eleven trays are located in the lower section of the column. Trays numbered 20 through 53 were located in the product section of the dividing wall section. A separate numbering system is used for 40 trays located in the feed section of the dividing wall section of the column.

The heavier components of the feed stream 2 will begin to move downward through the feed or receiving section of the dividing wall section of the column. They will eventually emerge in the liquid leaving the bottom of the dividing wall section and will flow into the bottom portion of the column 1. The least volatile, or heaviest, components of the kerosene will be concentrated into a liquid phase retained in the bottom of the column and withdrawn through line 5. The bottoms liquid stream of line 5 is divided into two portions. A first portion is removed through line 7 at a rate controlled by valve 18. Valve 18 is operated by an actuator 17 which receives a signal via the signal carrier 16. This signal is generated by the flow controller 15 which monitors the rate of flow through line 7. The flow controller in turn functions to reset the flow through valve 18 based upon a signal carried to it by the signal carrier 14. This signal is generated by the level controller 13 which monitors the level of liquid retained in the bottom of the fractionation column 1.

A second portion of the bottoms stream of line 5 is passed into line 6. This second portion flows through the reboiler 8 wherein it picks up heat energy prior to being returned to the bottom of column 1. This circuit provides the heat necessary for the fractional distillation which is performed within the column. A heating medium, such as hot oil or steam, flows through line 9 at a rate controlled by valve 10. The opening position of valve 10 is regulated in response to a signal carried by the signal carrier 12 from a flow controller means 11. Flow controller 11 monitors the flow of a heating medium which is leaving the reboiler 8. The location of this flow controller and valve are often reversed.

The lighter components of the feed stream of line 2 will travel upward in the vapors rising through the feed or receiving section of the dividing wall section of the column and will eventually merge into the upper portion of the column. The vapors rising from the receiving section and the vapors rising from the product section will pass upward through the chimneys 46 into the undivided upper portion of the column 1. These vapors will continue to be purified by the fractional distillation performed in the trays in the upper portion of the column. Eventually, overhead vapors will rise and enter the overhead condenser 28. In the embodiment illustrated in the figure the overhead condenser 28 is a contact condenser receiving a coolant from line 36 which enters the top of the column. The condensation which occurs in the top portion of the column, together with the collection of the liquid from line 36, results in there being an inventory of liquid in a liquid collection system located in the bottom of the contact condensing system. Vapor passageways are provided for vapor to pass upward through the liquid collection system. The amount of this liquid inventory is monitored by the level controller 40. A stream of the liquid retained in the contact condenser 28 is withdrawn through line 29. This stream should be substantially free of $C_9$-plus hydrocarbons. A first portion of this overhead stream is passed into line 30 and a second portion is passed through line 34. The portion of the overhead stream passed through line 34 is cooled in the fin fan (air) cooler 35. This stream is then further divided to form the net overhead stream removed through line 37 and the coolant stream returned to the column through line 36. The rate of flow of the net overhead stream of line 37 is controlled by a valve 38 which receives a signal transmitted by the level controller 40 and carried by the signal carrier 39. The flow rate of the coolant through line 36 is set by a flow controller 41 which generates a signal carried by the signal carrier or conduit 42 to the flow control valve 43 which actually performs the regulation of the flow rate.

The first split off portion of the overhead liquid stream of line 29 is passed through line 30 at a rate controlled by a valve 33. Line 30 delivers this liquid to the top tray of the undivided upper section of the column 1. The rate of flow of this liquid stream is physically regulated by the valve 33 which receives a signal via the signal conduit 32 from the flow controller 31. The flow controller 31 monitors the flow rate of the liquid stream of line 30. The flow rate of this stream is adjusted in response to a signal carried by the signal to carrier 45 from the temperature controller 44. Temperature controller 44 monitors the temperature of the liquid or vapor present at the top of the product section of the divided wall section of the column 1. The exact location of this temperature sensing which generates the signal used to control the flow of the liquid of line 30 is subject to some variation. Those skilled in the art will recognize that with minor adjustment this control point can be moved downward within the product section of the dividing wall section. The preferred location of this temperature sensing step is at the top tray of this section of the column. Those skilled in the art will also recognize that there is potential for variation in how the invention is implemented in that the logic control apparatus which actually calculates the required adjustment in the valve 33 may be located in either the temperature controller 44 or the flow controller 31 which receives a signal from the temperature controller. That is, the signal carried by the carrier 45 may only be a representation of the temperature measured by the temperature controller 44 or it may be representative of an adjustment which is required in the flow through line 30.

Liquid is supplied to the top of both the feed section and the product section of the dividing wall section of the column on the basis of signals generated by the ratio controller 56. The sequence of providing this liquid, however, starts with the collection of the entire liquid flow passing downward through the column in the liquid collection well or trap out 47 of a tray which extends across the cross section of the column at a point preferably located just above the top of the dividing wall section of the column. This collected liquid is then withdrawn and divided by a manifold system into separate streams fed to each section of the dividing wall section of the column. The level of the liquid in the liquid collection well 47 is monitored by a level controller 48. The level controller 48 generates a signal transmitted through the signal carrier 61 to a flow controller 58. The flow controller 58 in turn generates a signal transmitted through the signal carrier 59 to the flow control valve 60. Valve 60 regulates the flow of liquid through line 51. The liquid flowing through line 51 is delivered to the top portion of the product section of the dividing wall section of the column and forms the liquid flowing upon the top tray of this section. Liquid is withdrawn from the collection well 47 and pressurized by a pump not shown before division into the stream flowing through line 51 and the stream flowing through line 50. As an option not shown on the drawing, a surge drum may be located in this manifold system to allow for smoothing of the liquid flows going to the two sides of the dividing wall section. The flow rate of the stream flowing through line 50 is directly regulated by valve 53 which receives an actuating signal through the signal carrier 52 from the flow control device 54. Flow controller 54 monitors the flow rate to the valve 53 and adjusts the signal being transmitted to valve 53 in response to an input signal carried to the flow controller 54 by the signal carrier 55. This signal is generated by the ratio controller 56 which adjusts the desired liquid split or division between the two sections or chambers of the dividing wall section of the column. In order to do this, the ratio controller must receive signals representative of the flows in lines 50 and 51, which can be carried by signal carriers 55 and 57.

Those skilled in the art will recognize that the control system regulating the relative flows in lines 50 and 51 can be switched between the two lines. That is, the level control signal from the level controller 48 can be used to regulate the flow in line 50 instead of line 51, with the ratio controller 56 then acting on the flow in line 51.

Liquid enters the top of the product section or chamber of the dividing wall column through the open end of this section and vapor enters the bottom of the section. Both flows allow for the entrance of the kerosene boiling range hydrocarbons which are removed as the sidecut product stream of line 23. That is, hydrocarbons may enter the bottom of the product section of the dividing wall section as vapor generated in the lower portion of the column 1 and pass upward. In a similar fashion, hydrocarbons which were driven upward into the upper portion of the column 1 may enter as liquid from line 51. The column is designed and operated such that the liquid flowing downward through the product section of the column is intercepted by a substantially imperforate tray extending across a midsection of the product section of the column. This tray has a liquid collection well 25 in which a quantity of this descending liquid is collected. The level of the liquid in this well may be monitored by a controller not illustrated. A stream of the collected liquid is withdrawn from the well 25 through line 23. This liquid stream is pressurized by the pump 24 with a controlled amount being discharged from the process through line 23 as the middle product of the fractional distillation. In the illustrated embodiment, the flow rate of the product stream of line 23 is physically controlled by the valve 22 in response to a signal delivered to it by the signal carrier 62. A signal controlling the actuator of this valve is generated by the flow controller 21 which in turn receives a signal from the signal carrier 20. This signal is generated by the temperature controller 19 on the basis of the temperature in a lower portion of the product section of the dividing wall section of the column. The trap out tray located in a central region of the product section of the dividing wall section also contains a vapor chimney 27 to allow the upward passage of vapor through the product section. This is in keeping with the philosophy of the subject control system that the upward flow of vapor through the column is not directly regulated or controlled. An overflow weir 26 is also provided on this trap out tray, with this weir allowing liquid in excess of that required for the generation of the side product stream of line 23 to overflow the weir and to continue downward to the remainder of the product section.

The liquid overflowing the weir is the lower reflux liquid to the part of the product section which is located below the trap out tray. The rate of flow of this lower reflux is equal to what liquid is left after the net sidedraw product is removed. The division between the portion of the trap out liquid which is removed as the side product of line 23 and the refluxed portion can alternatively be performed external to the column. In this instance, the weir 26 is not provided, and all liquid is removed from the column by means of a total trap out. A portion of this liquid is then withdrawn through the optional (dotted) line 63 and passed on to the topmost tray in the lower portion of the product section. The rate of flow of this stream can be directly regulated by the valve receiving a signal from the temperature controller 19. By controlling the fraction of the trap out liquid which is passed into the column, it sets how much of the trap out liquid is left to be removed as the product. This alternative arrangement provides more direct monitoring and control of the reflux liquid flow rate but is more expensive to implement as an added line is required. In this mode a level controller in the liquid collection well 25 can be employed to control the total rate at which liquid is removed from the process.

Those skilled in the art will recognize that there are many alternatives possible in both the equipment and the methods of performing the invention illustrated in the figure. For instance, when the control of the operation of a valve involves two or more controllers, certain logic functions could be located in either of the controllers or split between them. That is, the items referred to as a temperature controller or a level controller on the subject figure may generate signals which are only representative of a measurement or may generate signals representative of the actual change which should be performed. In this regard it is noted that the level controller 40, shown at the top of the column, directly sends a signal to the valve 38. In contrast, the level controller 13, shown at the bottom of the column, sends a signal to a second controller 15 with the second controller generating the signal which is transferred to the valve 18.

In accordance with this description the invention may be characterized as a control apparatus for controlling the operation of the dividing wall section of a dividing wall fractional distillation zone, said fractional distillation zone comprising a reboiler, an overhead liquid condensing and collection system, and a fractionation column containing vapor-liquid contacting devices, with the fractionation column having a central, dividing wall section demarcated by a vertical dividing wall which divides the internal volume of the column into parallel feed and product dividing wall sections, the control apparatus comprising a first valve regulating the rate of withdrawal of a net overhead product stream, which is formed from an overhead product stream withdrawn from the overhead liquid condensing and collection system, with the first valve being regulated in response to a measurement of the accumulation of overhead liquid in the overhead liquid condensing and collection system; a second valve regulating the flow of a first liquid stream, which first liquid stream is also formed from the overhead product stream withdrawn from the overhead liquid condensing and collection system, with the operation of the second valve being regulated in response to a temperature measurement made within the column at a point in an upper portion of the product section of the dividing wall section of the column; a level measurement device measuring the liquid level in a liquid collection well of a liquid receiving tray, which liquid receiving tray intercepts liquid flowing downward in the column at a point above the dividing wall section of the column and below an upper section of the column containing vapor-liquid contacting devices; a manifold system connected to the liquid collection well for withdrawing an intermediate liquid stream from the collection well, with the manifold system dividing into two branches for dividing the intermediate liquid stream into second and third liquid streams, the branches of the manifold system being connected to the column to discharge the second liquid stream into one section and to discharge the third liquid stream into the other section of the dividing wall section of the column; a third valve regulating the flow rate of the second liquid stream in response to a signal generated by the level measurement device in the liquid collection well; a fourth valve regulating the flow rate of the third liquid stream in response to a signal generated by a ratio controller which receives an input characteristic of the flow rate of the second liquid stream; a fifth valve regulating the flow rate of a sidedraw liquid product withdrawn from an intermediate point of the product section of the dividing wall section of the column, with the operation of the fifth valve being regulated in response to a temperature measurement taken in a lower portion of the product section of the dividing wall section of the column; a controller regulating the input of heat into said reboiler; and a flow rate controller regulating the rate of withdrawal of a net bottoms stream from the column.

There are many types of appropriate sensors or controllers for measuring or monitoring temperature, pressure and liquid levels within the column. The choice of the most appropriate sensors and the most appropriate valves, etc., will depend, for instance, on such variables as the composition of the material being separated in the column and the conditions being employed in the column. The various signal carriers or conduits, such as 45 and 55, illustrated on the figure may be in the form of an electrical wires, cables or conduits, or optical cables. While at this time, certainly not preferred at this time, it is envisioned that in the future such carriers would be replaced by wireless transmission of controlled signals.

The column illustrated in the Drawing employs an internal condenser in the form of a contact condenser as part of the overhead liquid condensing and collection system. This is only one alternative means of providing the cooling and condensation required for the operation of the column. A more conventional external condenser and overhead receiver can be employed if desired to form this system. The use of an internal condenser can reduce the capital cost of the overall fractionation zone and was for this reason employed in the development leading to the subject control system.

A further possible variation in the control system of FIG. 1 is the integration of the control system into a control system of the unit which generates the feed stream of line 2 or into the units or processes which receive the various product streams generated in column 1. Furthermore, the operation of the column may be integrated into an advanced control system regulating not just the overall control of the column but that of associated processes. Yet another optional variation not shown on the drawing is the use of analytical instruments to measure the composition of one or more of the effluent streams and to adjust the operation of the column to compensate for a divergence from a desired composition.

The subject control system and control method are believed applicable to any separation of volatile compounds which can be performed in a dividing wall fractional distillation column. Non-limiting examples of these are the separation of a wide boiling range petroleum-derived fraction into fractions having narrower boiling point ranges, the separation of aromatic hydrocarbons such as benzene and toluene, the simultaneous stripping and rerunning of feed stream, the recovery of solvents or desorbents from the products of adsorptive or liquid-liquid separation processes, the separation of halogenated compounds, the separation of motor fuel blending components and the separation of product and recycle compounds in aromatic hydrocarbon alkylation, transalkylation and disproportionation processes.

What is claimed:

1. A dividing wall fractional distillation column having a vertical central portion divided into a feed section and a parallel product section by a dividing wall, the parallel feed and product sections having upper and lower ends, the dividing wall fractional distillation column comprising:

a.) an upper section containing vapor-liquid contacting devices;

b.) an overhead condensing system in which vapor rising from the upper section of the column is at least partially condensed and an overhead liquid is produced;

c.) a first flow control valve which controls the flow of a portion of said overhead liquid into the upper section of the column as reflux;

d.) a first temperature sensor, which monitors the temperature in the upper end of the product section of the column and generates a signal used in controlling the operation of the first flow control valve;

e.) a first liquid collection system located in an upper portion of the column below the upper section and above the dividing wall, the first liquid collection system blocking downward liquid flow through substantially all of the cross section of the column;

f.) a first conduit providing fluid communication with the feed section, and a second conduit providing fluid communication with the product section;

g.) a flow ratio controller which controls the division of liquid collected in the first liquid collection system into separate streams which flow via the first and second conduits into the feed and product sections of the column;

h.) a second liquid collection system, which is located in an intermediate portion of the product section of the column, with the second liquid collection system having a liquid collection well from which a side product is removed from the column;

i.) a second flow control valve which controls the rate of side product removal in response to a second signal;

j.) a second temperature sensor, which monitors the temperature in the lower end of the product section of the column and generates the second signal used in controlling the operation of the second flow control valve;

k.) a control system for regulating the heat input to the column by a reboiler system located at the bottom of the column; and l.) a flow control system for regulating the rate at which a net bottoms product is removed from the column.

2. The dividing wall fractional distillation column of claim 1 wherein the second flow control valve controls the rate at which the side product flows through a transfer line as a net product stream removed from the process.

3. The dividing wall fractional distillation column of claim 2 wherein a liquid overflow weir is provided within the second liquid collection system.

4. The dividing wall fractional distillation column of claim 1 wherein the second liquid collection system comprises a total trap out tray and in that the second flow control valve controls the rate at which the side product withdrawn from the trap out tray flows through a transfer line back to the column at a point under the total trap out tray as lower reflux.

5. A control apparatus for controlling the operation of a dividing wall section of a dividing wall fractional distillation zone, said fractional distillation zone comprising a reboiler, an overhead liquid condensing and collection system, and a fractionation column containing vapor-liquid contacting devices, with the fractionation column having a central, dividing wall section demarcated by a vertical dividing wall which divides the internal volume of the column into parallel feed and product dividing wall sections, the control apparatus comprising a.) a first valve regulating the rate of withdrawal of a net overhead product stream, which is formed from an overhead product stream withdrawn from the overhead liquid condensing and collection system, with the first valve being regulated in response to a measurement of the accumulation of overhead liquid in the overhead liquid condensing and collection system;

b.) a second valve regulating the flow of a first liquid stream, which first liquid stream is also formed from the overhead product stream withdrawn from the overhead liquid condensing and collection system, with the operation of the second valve being regulated in response to a temperature measurement made within the column at a point in an upper portion of the product section of the dividing wall section of the column;

c.) a level measurement device measuring the liquid level in a liquid collection well of a liquid receiving tray, which liquid receiving tray intercepts liquid flowing downward in the column at a point above the dividing wall section of the column and below an upper section of the column containing vapor-liquid contacting devices;

d.) a manifold system connected to the liquid collection well for withdrawing an intermediate liquid stream from the collection well, with the manifold system dividing into two branches for dividing the intermediate liquid stream into second and third liquid streams, the branches of the manifold system being connected to the column to discharge the second liquid stream into one section and to discharge the third liquid stream into the other section of the dividing wall section of the column;

e.) a third valve regulating the flow rate of the second liquid stream in response to a signal generated by the level measurement device in the liquid collection well;

f.) a fourth valve regulating the flow rate of the third liquid stream in response to a signal generated by a ratio controller which receives an input characteristic of the flow rate of the second liquid stream;

g.) a fifth valve regulating the flow rate of sidedraw liquid withdrawn from an intermediate point of the product section of the dividing wall section of the column, with the operation of the fifth valve being regulated in response to a temperature measurement taken in a lower portion of the product section of the dividing wall section of the column;

h.) a controller regulating the input of heat into said reboiler; and i.) a flow rate controller regulating the rate of withdrawal of a net bottoms stream from the column.

6. The control apparatus of claim 5 wherein the liquid receiving tray intercepts substantially all of the liquid descending through the column above the dividing wall section of the column.

7. The control apparatus of claim 5 wherein the controller regulating the input of heat into the reboiler maintains the heat input at a substantially constant level.

8. The control apparatus of claim 5 wherein the third valve regulates the flow of the second liquid stream, which stream is passed into the feed section of the dividing wall section of the column.

* * * * *